United States Patent Office 3,487,995
Patented Jan. 6, 1970

3,487,995
CROSSBAR SWITCHES
Rene Jean Holzhaeuser, Choisy-le-Roi, and Jean-Pierre Paulet, Levallois-Perret, France, assignors to C.I.T.—Compagnie Industrielle des Telecommunications, Paris, France, a corporation of France
Filed Dec. 8, 1967, Ser. No. 689,111
Claims priority, application France, Dec. 14, 1966, 87,459
Int. Cl. H01h 67/14
U.S. Cl. 335—112                    12 Claims

ABSTRACT OF THE DISCLOSURE

A compact crossbar switch comprising two detachable frames, a lower frame carrying a plurality of vertical switch assemblies, associated output jacks and cable connections and stationary electric switch operated motor windings, the upper frame rotatably supporting a plurality of control bars overlying the vertical switch assembly in operative relation therewith with armatures respectively carried by the rotatable control bar in operative relation with the motor coils.

---

The present invention relates to a crossbar switch which can be used in all switching techniques and more particularly, in the telecommunication industry.

It has as its object to provide a switch of small dimensions, rapid in operation, presenting easy access to component parts, and with the possibility of connection by plugging.

The switch according to the invention is characterized more particularly in that it is constituted by two disassemblable parts: a lower part or main frame comprising essentially vertical assemblies and electric motors for same, electric motors for control of horizontal bars, an intermediate strip and jacks for connection; an upper part or supporting frame for the horizontal paths comprising essentially horizontal control bars and the armatures of the horizontal electric motors, the disassembly and reassembly of these two parts being effected easily without any particular precautions in such a manner as to have easy access to the components.

According to one feature of the invention, the switch is constituted of monobloc subassemblies which can be regulated independently of one another and then assembled on the main frame.

Another feature of the invention consists in the articulation of the vertical control bars, each bar being controlled by two electric motors, one at each end, and regulating devices being provided for determining the travel of each control bar.

According to still another feature of the invention, the horizontal multiple of the output wires is provided by means of bare conductors connected to an intermediate strip whose outputs are connected to the output connector by insulated wires; all the other connections are effected by wound connections and go directly to the outlet connector, the apparatus as a whole being pluggable and unpluggable.

Another feature of the invention consists in the mounting of the horizontal control bars, each end of which is mounted on a ball bearing or any other type of bearing, and one end of which comprises a braking device for suppressing any parasitic vibratory movement after release.

According to yet another feature of the invention, the output connector will preferably be composed of flat elements of three pins with molded-on support, these elements being stacked in accordance with the number of points necessary.

In one form of embodiment, the switch according to the invention comprises ten vertical inputs with three wires per input and five horizontal control bars with two positions per bar; the three wire outputs can be multiplied on the homologous pins of the ten vertical assemblies or form two separate multiples, each limited to five verticals.

Other features of the invention will be brought out from the description which follows of one form of embodiment of a switch according to the invention.

In the drawings, which are given simply by way of non-limitative example.

Figure 1:
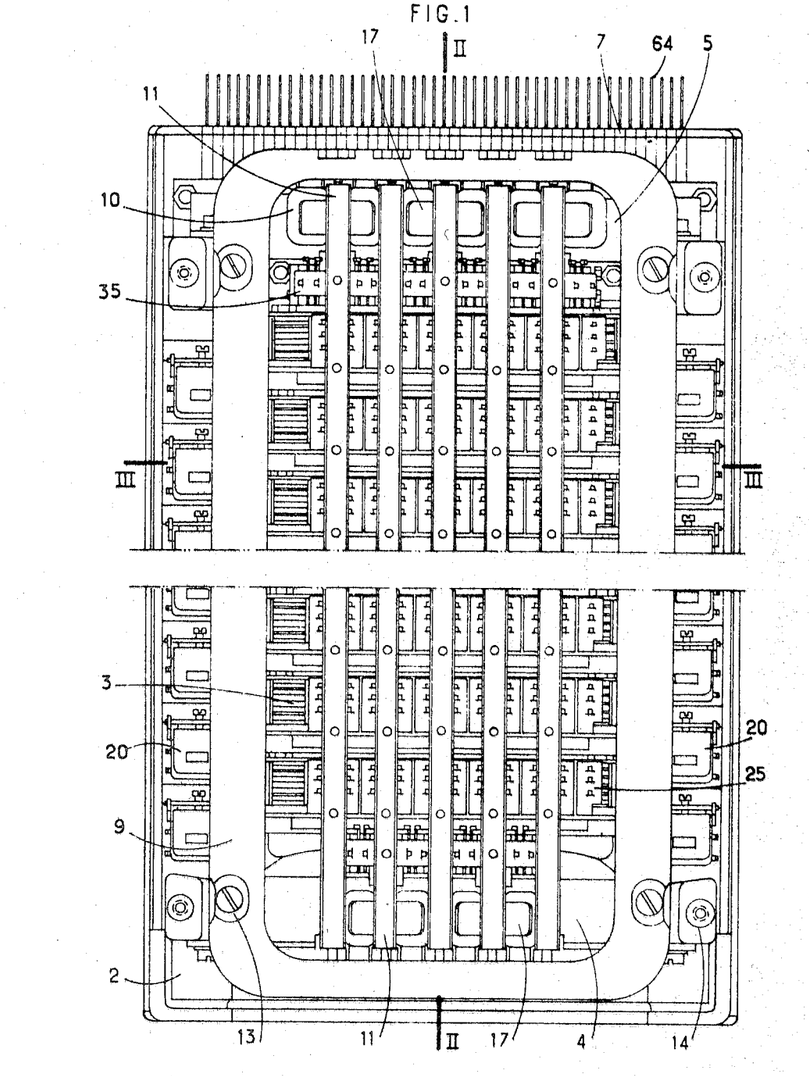
FIGURE 1 shows a top plan view of the switch according to the invention with the cover removed.
Figure 2:
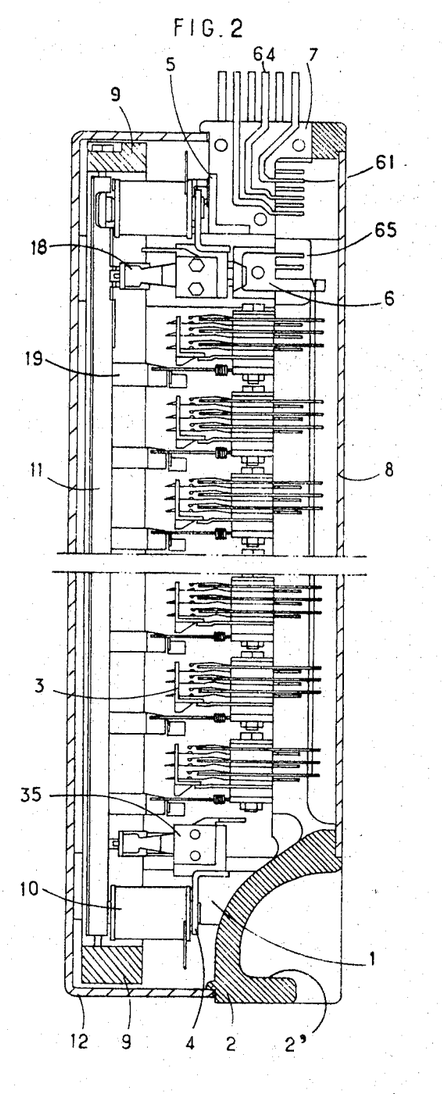
FIGURE 2 is a longitudinal sectional view of the switch taken on the plane II—II of FIGURE 1.
Figure 3:
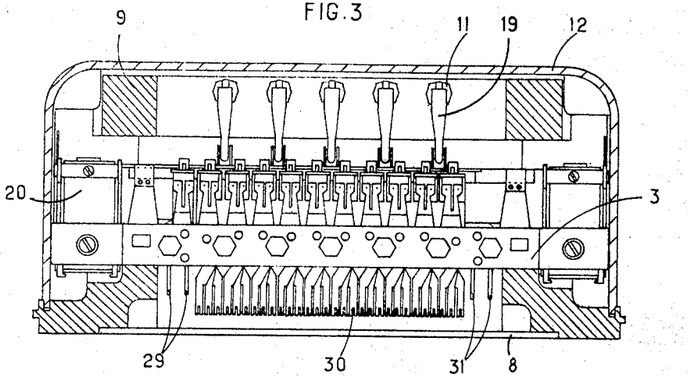
FIGURE 3 shows a cross-section of the switch taken on the plane III—III of FIGURE 1.

In one form of embodiment of the invention shown in FIGURES 1, 2 and 3, the complete switch is in the form of an oblong parallelepiped; it is easily disassembled into three parts:

A lower part 1 constituted by a main frame comprising a metal base 2 made preferably of an alloy cast under pressure comprising a grip shell 2' and serving to support ten vertical assemblies, such as 3, a mounting plate 4 for two horizontal electric motors, a mounting plate 5 for three horizontal electric motors, an intermediate connection strip 6, an output connector 7 and a closure plate 8;

An upper part 9 constituted by a supporting frame for the horizontal bars, comprising a metal frame preferably consisting of an alloy cast under pressure supporting five horizontal control bars 11. The upper part 9 is fixed by four screws 13 to the lower frame 1;

A transparent cover 12 which is dust-tight and is fixed to the main frame 1 by four screws 14 covering the switch.

Figure 4:
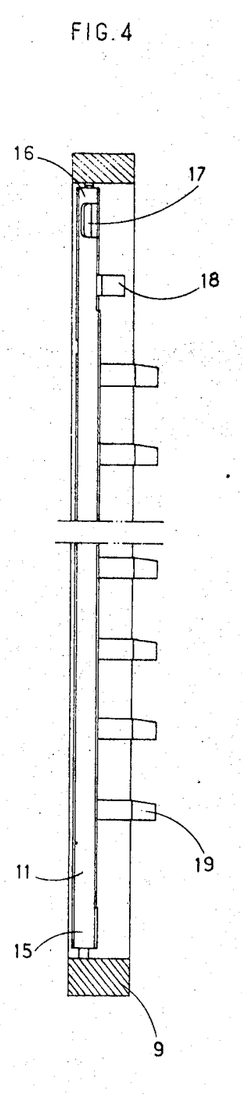
FIGURE 4 shows a longitudinal section view of the supporting frame for the horizontal control bars.

The supporting frame 9 for the horizontal bars 11 is shown separately in FIGURE 4 in longitudinal section. A horizontal control bar 11 can rotate to either side of two fixed end pivots 15 and 16 mounted on ball bearings or any other type of bearing, one pivot 16 of which is mounted with a braking device which is shown in more detail in FIGURE 20. At one of the ends of each horizontal control bar there is fixed the mobile armature 17 of a horizontal bar electric motor 10 and an insulating control pin 18 permitting actuation of the operating control stack for the horizontal electric motor. Also at right angles with each vertical assembly there is fixed or molded on each horizontal control bar a dog or cam 19 adapted to actuate the selection pins of the apparatus situated at the meeting of the horizontal and vertical paths.

Figure 5:
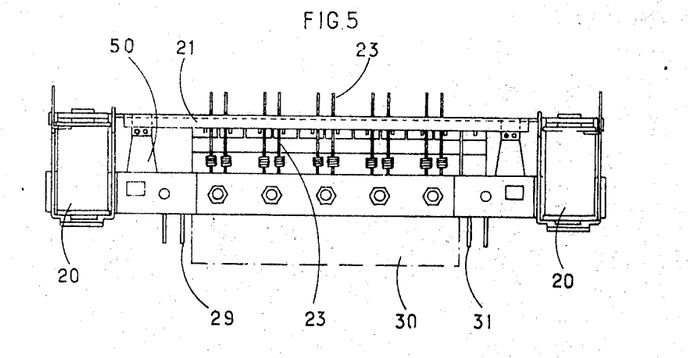
FIGURE 5 shows an elevational view of a vertical assembly.
Figure 6:
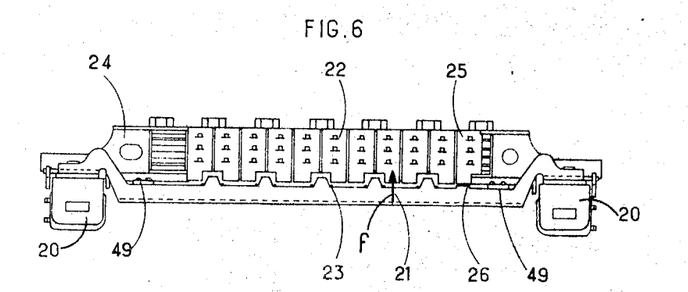
FIGURE 6 shows a view of the same vertical assembly seen from above.

FIGURE 5 is an elevational view (selection pins side) of a vertical assembly, whilst FIGURE 6 is a corresponding view thereof from above.

Each vertical assembly 3 comprises two electric motors, such as 20, one at each end and which operate simultaneously so as to drive a control bar 21 without torsion; the latter is in fact very light so as not to have too much inertia and to be capable of rapid operation. The displacement of stack control plates 22 is effected by the interposition of a selection pin 23 between the bar 21 and the plate 22. The said pin is displaced laterally by the movement of the cam 19 (see FIGURE 4) when the horizontal bar is actuated. The movement of the bar 21 in the direction of the arrow $f$ (FIGURE 6) is thus communicated to the plate 22 by means of the selection pin 23 previously moved away towards the right. A strip 24 supports stacks of springs 3 controlled by plates, such as 22. An end plate 25 is controlled by a boss 26 of the control bar 21 without interposition of a selection pin in such a manner that at each excitation of the electric motors 20 the springs 25' controlled by this plate 25 are displaced and make their contacts; thus, there is a means for verifying the engagement of the vertical path. The connection of the connecting wires is effected at the pins 29 in the case of the vertical inputs and at the connection lugs 30 (shown in FIGURE 3) in the case of the outputs and at the pins 31 in the case of the vertical control stacks.

On the main frame 1 (see FIGURES 1 to 3), there are thus mounted ten vertical assemblies, such as that shown in FIGURES 5 and 6.

Figure 7:
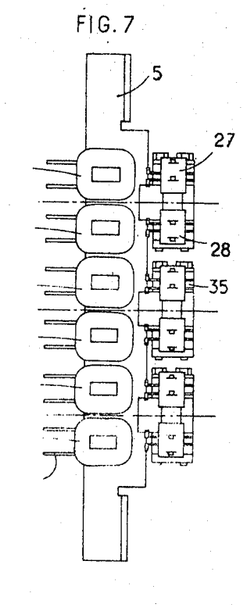
FIGURE 7 is a view from above of a control plate for three horizontal bars.
Figures 8, 9:
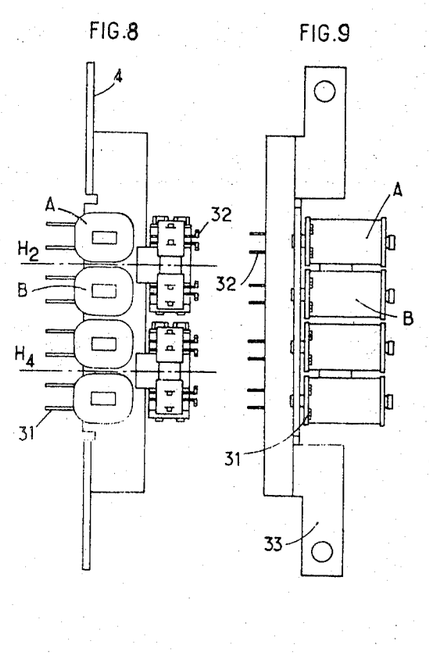
FIGURE 8 is a view from above of a control plate for two horizontal bars.
FIGURE 9 shows a side view of the plate according to FIGURE 4.
Figures 10, 11:
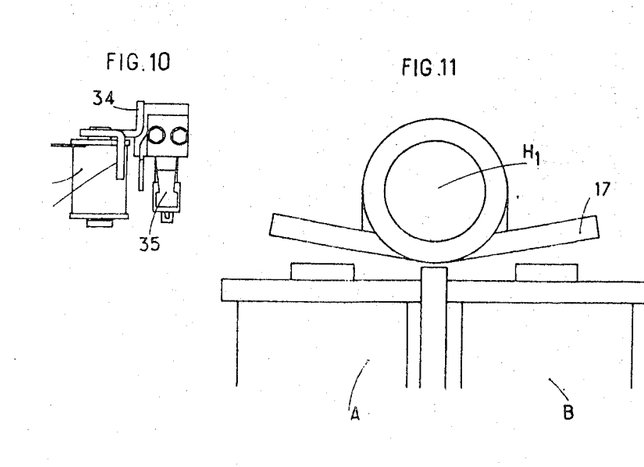
FIGURE 10 shows a profile view of the plate according to FIGURE 7.
FIGURE 11 shows the mobile armature of a horizontal electric motor.

Referring to FIGURE 1, it will be seen that at the right-hand side of the apparatus (output connector side) there are three horizontal control bars which support an armature 17, whereas at the left-hand side there are only two. It should be remarked that in known manner a left-hand armature is always arranged between two right-hand armatures. This arrangement is shown in FIGURES 7 and 8: the plate 5 comprises three electric motors AB, whereas the plate 4 comprises only two. On the plate 5 the first double electric motor 10 controls a horizontal bar $H_1$, the second controls a bar $H_3$ and the third controls a bar $H_5$; on the plate 4, the first double electric motor 10 controls a bar $H_2$ and the second double electric motor controls bar $H_4$. The successive horizontal bars are therefore alternately controlled by electric motors situated to the right and left of the apparatus. FIGURE 11 shows that a horizontal control bar, such as $H_1$, can have its armature 17 attracted either by an electric motor A or by an electric motor B. Consequently, a control cam 19 of a horizontal control bar can rotate either towards the right or towards the left and displace one or the other of the two selection pins 23 of FIGURE 5. Each of the five horizontal bars $H_1$ to $H_5$ can thus take up two positions depending on the electric motor A or B which is operated.

A horizontal ocntrol bar (see FIGURE 4) also comprises at one end a control cam 18; this cam can control a plate 27 (FIGURE 7) or a plate 28, each plate acting on a stack 35 in supervising the effective operation of the horizontal bar. Therefore, there are as many control stacks 35 as electric motors A and B, and these stacks are fixed on the same plates 4 and 5 which support the electric motors.

FIGURE 9 is an elevational view of FIGURE 8; the electric motors A and B associated with each direction of operation of one and the same bar are shown here again. The pins 62 are connection pins for the horizontal electric motors and the pins 32 are the connection pins of the control stacks. The lugs 33 of the plate supporting the electric motors and control stacks are used for fixing on the main frame.

FIGURE 10 is a profile view which is valid for both FIGURES 7 and 8; the plates 4 and 5 supporting the electric motors A and B comprise two oppositely bent-over lugs one of which 33 is used for fixing the assembly, whereas the other 34 is used for fixing control stacks 35 to the plate itself.

Figure 12:
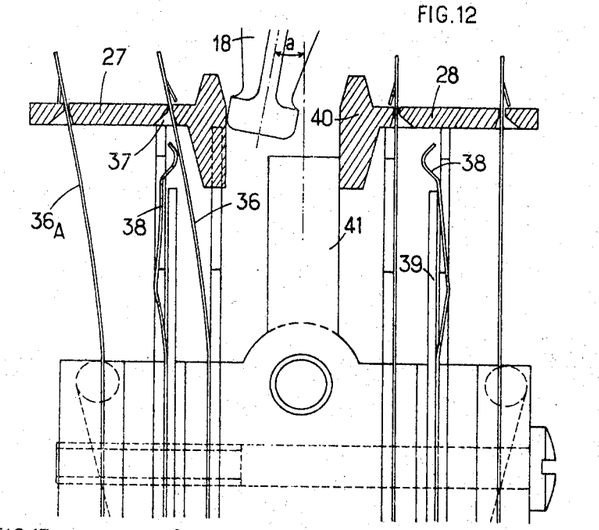
FIGURE 12 shows the device for controlling the operation of a horizontal bar.

The stac 35 supervising the operation of the horizontal bar is shown in FIGURE 12; the control cam 18 fixed to the horizontal bar actuates, in the position indicated in this figure, the left-hand control stack after having turned through an angle $a$ relatively to its position of rest. The cam 18 acts either on the control plate 27 if the control operation is that indicated in this figure, or the control plate 28 if the control operation is in the opposite sense. Mobile springs 36 which extend through narrow apertures 37 formed in the control plates are entrained by the movement of the latter and make contact with fixed springs 38. The springs 36 and 38 are preferably made of phosphor-bronze and the portions where contacts are made are made of precious metal.

Thick counterblades 39 serve as abutments for the springs 38 which tends to be returned towards the center as a result of their preload in the condition of rest.

In the state of rest, the ends 40 of the control plates 27 and 28, under the action of the mobile springs 36, therefore, tend to move towards the center and thus, come to abut on the central part 41 which maintains the adequate spacing for the accommodation of the cam 18.

The end springs 36A, therefore, have the object of increasing the restoring force for the return to the condition of rest when the action of the control electromagnet of the horizontal bar has ceased.

Figures 13A, 13B:
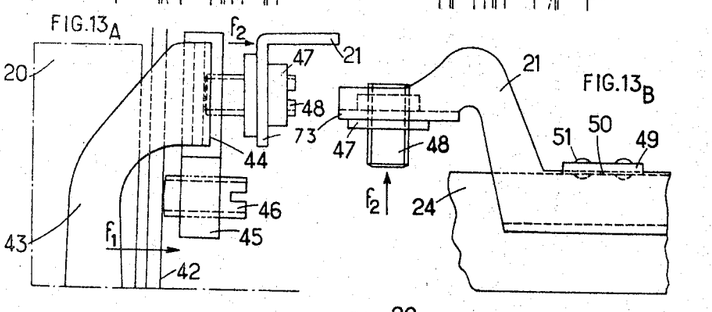
FIGURE 13A shows the device for regulating the travel of a vertical control bar.
FIGURE 13B shows the articulation of the vertical control bar.

FIGURE 13A shows, in elevation, details of the regulation of the travel for the vertical control bar 21 of the output stack mounted on the vertical assembly already shown in FIGURES 5 and 6. An electric motor 20 being mounted at each end of the vertical assembly comprises a fixed frame 42 and an armature which is mobile under the action of the ampere-turns supplied by the winding when the latter is excited by a current; the mobile armature comprises two arms, such as 43 (one on each side of the frame 42), adapted to move in the direction of the arrow $f_1$ when the electric motor is excited. The ends 44 of the two arms 43 are bent over and a plate 45 made of hard plastics material is fixed on the ends of the two arms. In the plate 48, an adjusting screw 46 is fixed. The actuating bar 21 comprises at each end an angle portion 73 in which is fitted a ring of hard plastics material 47 and into the plastics material ring there is screwed an adjusting screw 48. It will be apparent that when the adjusting screw 46 is screwed, the armature arm is displaced in the direction of the arrow $f_1$ and consequently, the displacement given to the bar 21 is smaller, the screw 48 bearing on the plate 45 in the condition of rest.

FIGURE 13B, in a view from above, shows details of the articulation of the same actuating bar 21. It has been seen from FIGURE 13A that when the vertical electric motor is excited, the movement of the armature arm is effected in the direction of the arrow $f_1$; a pressure is, therefore, exerted on the bar 21 in the direction of the arrow $f_2$, which is shown again in FIGURE 13B. In FIGURE 13B, it will be seen that the bar 21 comprises a bent-over tab 49 on which is fixed a flexible leaf spring 50 by means of two rivets 51; the other end of the leaf spring is fixed to the strip 24 which supports the output spring stacks (FIGURES 5 and 6). This articulation by means of a flexible leaf spring is precisely reproduced at the other end of the bar 21, so that when the two vertical electric motors are excited simultaneously, the forces acting in the direction of the arrow $f_2$ act simultaneously on the bar 21 and the latter is moved in the same direction as arrow $f_2$, subjecting its two leaf springs 50 to preload. When excitation of the two electric motors ceases, the bar 21 is returned to its normal position of rest by the restoring force of the two leaf springs. Therefore, the bar 21 is not connected rigidly to the electric motor although its travel can be regulated.

Figure 14:
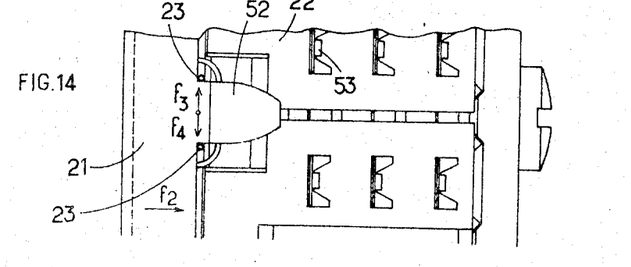
FIGURE 14 shows the vertical stack control seen from above.

FIGURE 14 shows, in a view from above, how the bar 21 acts on the output contacts. It has been seen in connection with FIGURE 11 that each horizontal control bar could act by cams 19 on the selection pins 23, the action being effected in the direction of the arrow $f_3$ or in the direction of the arrow $f_4$. In the condition of rest, the selection pins 23 are vertical and are exactly accommodated in the corners formed at the base of a tooth 52; the bar 21 comprises as many teeth 52 as there are horizontal bars. If the horizontal bar acts in the direction of the arrow $f_3$, the selection pin 23 is driven in the same direction and comes to be situated in the space between the tab of the bar 21 and the left-hand side edge of the plate 22. If, at this instant, the vertical electric motors are operated (this is always later than the operation of the horizontal bar), the bar 21 moving in the direction of the arrow $f_2$ entrains with it only the upper plate 22 for which the selection pin is in position, which makes the corresponding contacts of the springs 53.

Figure 15:
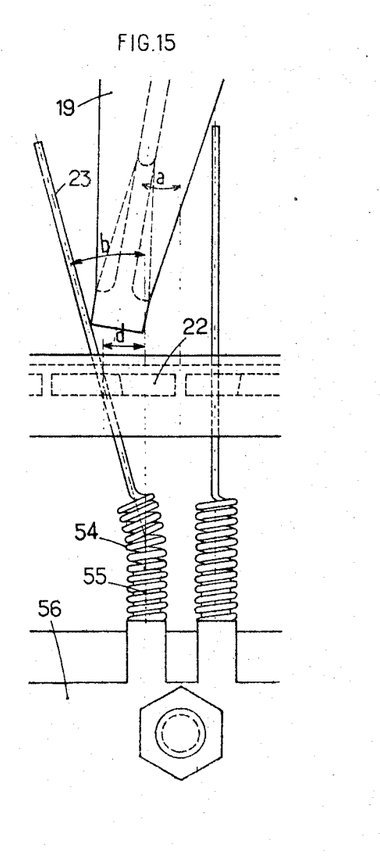
FIGURE 15 shows the mounting and actuation of the selection pins.
Figure 16:
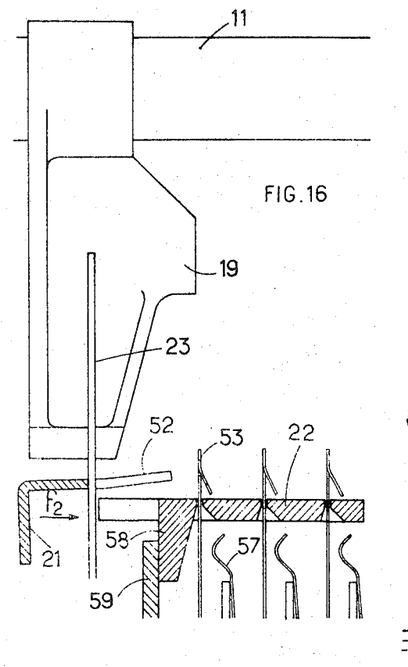
FIGURE 16 is a profile view showing the vertical stack control.

FIGURES 15 and 16 supplement FIGURE 14. FIGURE 15 shows more particularly how the selection pins 23 are actuated. In the condition of rest, the two selection pins associated with the same horizontal control bar are parallel. When the horizontal bar 11 is actuated, it entrains in its movement the insulating cam 19 which rotates through the same angle $a$ as the bar. In its movement, the cam 19 displaces the selection pin 23 through an angle $b$ which is larger than $a$; horizontally, the displacement takes the form of a distance $d$ at the level of the plate 22. The selection pins 23 have part of their turns 54 screwed onto screw-threaded extensions 55 of the teeth of a metal plate 56 fixed on the general stack 24. It will be appreciated, with the help of FIGURE 16, that the displacement of the bar 21 in the direction of arow $f_2$, occurring when the selection pin has just been placed opposite the plate 22, entrains the latter in its travel. The plate 22 entrains the mobile springs 53 with it and contacts are made with the springs 57. The springs 53 have a nose, the object of which is to render the plate 22 fast with these springs. The portions of the springs 53 and 57 which come into contact are made of precious metal. The rest position of the plate 22 is determined by a dog 58 which comes to abut on a thick spring 59, the preload of the springs 53 being such that it acts in the direction opposite to the arrow $f_2$.

Figure 17:
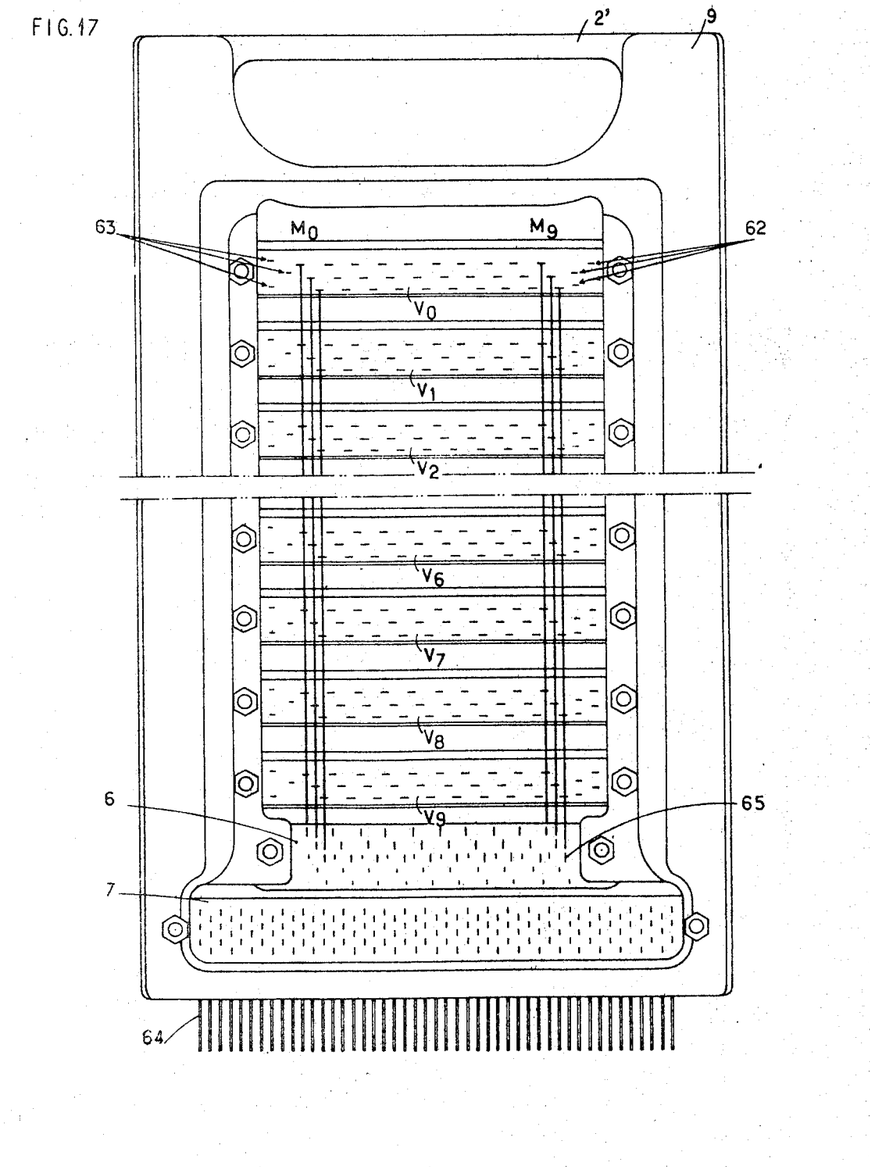
FIGURE 17 is a general view of the multiplying means and the connection thereof.

FIGURE 17 is a view from below of the switch when the closure plate is lifted. This shows all the connections. Distributors $V_0$, $V_1$, $V_2$ ... $V_7$, $V_8$, $V_9$ correspond to the ten vertical assemblies, the reference 6 represents an intermediate strip shown in more detail in FIGURE 18 and the reference 61 an output connector shown in detail in FIGURE 19. The intermediate strip 6 receives the output pins multiple, the said multiple being constructed in accordance with the device forming the subject of the French patent application No. 79,569 of Oct. 11, 1966, now French Patent 1,503,732, by the applicant company for "Multiplying Apparatus"—Inventor R. Holzhaeuser. FIGURE 17 shows the first and last multiples $M_0$ and $M_9$ among the ten output multiples; these multiples are constructed of conductors which are bare as far as the input pins of the intermediate strip 6. Between the output pins 65 of the intermediate strip 6 and the input pins 61 of the output connector 7, the cabling will preferably be made of insulated wire 25 of 30/100.

The four pins 31 per vertical are the connection ends of the vertical control stacks; four wires per vertical, or forty wires, are thus connected directly to the input pins of the output connector 7. There is an analogous arrangement for the pins 63 which are the connection ends of the inputs; thus, three wires per vertical, or thirty wires, are thus connected directly to the input pins of the connector 7. The control wires of the electric motors are also connected directly to the output connector and preferably by the winding-on connection method. The output pins 64 at the external side of the output connector 7 can be plugged into female jacks fixed to the bay.

Figure 18:
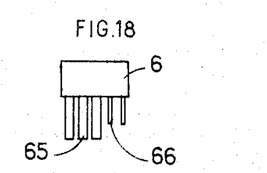
FIGURE 18 is a profile view of the intermediate strip.

FIGURE 18 is a side view of the intermediate connection strip 6. The connection of the multiples is effected on the large pins 65 and connections with the output connector by means of the pins 66. The one-piece intermediate strip is preferably constituted by pins of nickel silver with Bakelite molded about them.

Figure 19:
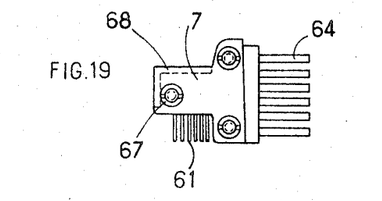
FIGURE 19 is a profile view of the output connector.

FIGURE 19 shows a side view of the output connector 7 which is composed of flat elements of three pins molded over (FIGURE 2). These elements are stacked and clamped together by screws 67, the assembly being rendered rigid by a suitable metal profile 68 which can also be used for fixing to the main frame. The pins will be in a staggered arrangement permitting the access of the winding gun.

Figure 20:
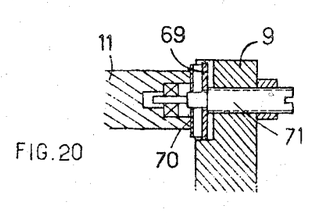
FIGURE 20 shows the braking device used in the control of a horizontal bar.

FIGURE 20 shows details of connection arrangements with a braking device for a horizontal control bar 11 on the supporting frame 9 made of cast alloy. The journal pin 74 of the control bar 11 is screwed into the support 9. It fits through a spring blade 70 fast with the support 9 and prevented from rotating relative thereto. It also extends through a plate 69 fast with the support 9, the said plate exerting some pressure on the spring blade 70. When the control bar 11 describes a certain angle of rotation under the action of an electric motor and is suddenly released when the electric motor becomes inoperative again, the braking action exerted by the spring 70 on the end of the bar 11 damps the return movement and eliminates any parasitic oscillations.

The switch according to the invention comprises ten vertical assemblies and five horizontal control bars with two positions. The lines are three wire lines and multiplying can be effected on the homologous output pins of the ten verticals or in twice five verticals.

The invention is not, of course, in any way limited to the form of embodiment described and illustrated which has been given only by way of example; more particularly, without departing from the framework of the invention, it would be possible to modify certain arrangements or replace certain means by equivalent means. More especially, it will be apparent that the capacity of the apparatus could be modified without departing from the framework of the invention.

What is claimed is:

1. A compact crossbar switch comprising two detachable frames, a lower frame supporting a plurality of vertical switch assemblies, associated output jacks and cable connections, an upper frame rotatably supporting a plurality of first horizontal control bars, said first horizontal control bars overlying said vertical switches in operative relationship therewith, electric motor coils fixedly carried by said lower frame and armatures respectively carried by said first horizontal control bar in operative relationship with said motor coils for selectively operating said switch assemblies in response to energization of said motor coils, second control bars carried by said lower frame and movable with respect thereto for actuating said vertical switch assemblies, means for interposing, between a second control bar and a vertical switch control plate, selection pins for selectively controlling the vertical switch and means for fixing said selection pins to said lower frame independently of said first horizontal control bar.

2. The crossbar switch as claimed in claim 1 further including means for detachably coupling said first and second frames to allow disassembly and reassembly of said crossbar switch while allowing easy access to the switch components.

3. The crossbar switch as claimed in claim 1 further including second control bars carried by said lower frame and movable with respect thereto for actuating said vertical switch assemblies, electric motor coils carried by said lower frame for moving said second control bars, armatures carried by said second control bars and means for controlling the extent of movement of said second control bars with respect to said stationary motor coils.

4. The crossbar switch of claim 3 further including pluggable pins carried by said lower frame to allow detachable electrical connection to a multiple unit switchboard, said lower frame including a shell grip at its front portion and associated side grooves to permit removable guided coupling within a compartment of said multiple unit switchboard.

5. The crossbar switch as claimed in claim 1 further including ball bearing means for supporting said first control bars for rotation with respect to said upper frame and braking means carried by said frame for suppressing any parasitic vibratory movement of said rotatable first control bars after de-energization of said electric motor coils.

6. The crossbar switch as claimed in claim 3 further including flexible metal blades carried at each end of said second control bars for returning said second control bars to their initial position after de-energization of said associated electric motor coils.

7. The crossbar switch as claimed in claim 5 wherein said braking device comprises a spring blade carried by said upper frame member and having a portion in frictional engagement with the end of said rotatable first control bar with the compression of said spring blades preventing parasitic vibratory movement of said first control bar in response to de-energization of the associated electrical motor coils.

8. The crossbar switch as claimed in claim 1 wherein said associated output jack of said crossbar switch comprises for each vertical switch assembly, three pins encased in a molding, with said pins being stacked in accordance with the number of necessary points.

9. The crossbar switch as claimed in claim 1 wherein said lower frame includes a groove carried circumferentially thereby and a cover formed of transparent plastic material carried by said lower frame, with the sides of said cover penetrating into said groove to dust-seal the switch components, said crossbar switch further including lead-sealed fixing screws coupling said cover to said lower frame.

10. The crossbar switch as claimed in claim 1 further including stack control plates carried by said vertical switch assemblies and cam means carried by said control bars for moving said control plates, vertical stack control springs carried by said switching assemblies, apertures carried by said control plates with said apertures receiving the free ends of said vertical stack control springs, and a nose formed on at least one of said vertical stack control springs passing through each control plate so as to maintain the control plates in position at the end of said stack control springs.

11. The crossbar switch as claimed in claim 10 further including selection pins having one end fixed to said lower frame, and the free end extending in juxtaposition with respect to said vertical stack control plates and means carried by said first rotatable control bar for displacing a selection pin laterally so as to move it into operative position with respect to said second control bar, and said vertical stack control plate.

12. The crossbar switch as claimed in claim 11 wherein the second control bar includes teeth equal in number to the number of horizontal control bars, selection pins carried by said crossbar switch at each side of a tooth, whereby movement of said rotatable control bar in either direction and movement of said second control bar upon energization of a motor coil ensures actuation of a particular preselected vertical switch assembly.

References Cited

UNITED STATES PATENTS

| | | | |
|---|---|---|---|
| 2,309,422 | 1/1943 | Vigren | 335—108 |
| 2,816,173 | 12/1957 | Dietsch | 335—112 |
| 2,917,587 | 12/1959 | Graybill | 335—112 |
| 2,950,350 | 8/1960 | Vincent | 335—112 |
| 2,955,168 | 10/1960 | Schacat | 335—112 |
| 2,961,493 | 11/1960 | Torisu | 335—112 |
| 3,369,203 | 2/1968 | Rea | 335—112 |

BERNARD A. GILHEANY, Primary Examiner

H. BROOME, Assistant Examiner

UNITED STATES PATENT OFFICE
CERTIFICATE OF CORRECTION

Patent No. 3,487,995    Dated January 6, 1970

Inventor(s) Rene Jean Holzhaeuser and Jean-Pierre Paulet

It is certified that error appears in the drawings of the above-identified patent and that said Letters Patent are hereby corrected as shown below:

1. In Figure 3, the numerals 29 and 31 should be reversed.

2. In Figure 5, the terminals for coils 20, which extend upwardly at each end of the assembly, should be labeled 72.

3. In Figure 6, the paired terminals for each coil should be identified by the numeral 72 and the numeral 25' should be added to identify the individual elements of the bank 25 on the righthand side of the apparatus.

4. For Figures 7, 8 and 9, the terminals 31 should bear the numeral 62.

SIGNED AND
SEALED
JUL 28 1970

(SEAL)
Attest:

Edward M. Fletcher, Jr.
Attesting Officer

WILLIAM E. SCHUYLER, JR.
Commissioner of Patents